(12) United States Patent
Miyamoto et al.

(10) Patent No.: US 11,233,914 B2
(45) Date of Patent: Jan. 25, 2022

(54) IMAGE READING APPARATUS

(71) Applicant: SEIKO EPSON CORPORATION, Tokyo (JP)

(72) Inventors: Shintaro Miyamoto, Shiojiri (JP); Yoshiyuki Okazawa, Shiojiri (JP); Kensuke Tamai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/130,263

(22) Filed: Dec. 22, 2020

(65) Prior Publication Data
US 2021/0203802 A1 Jul. 1, 2021

(30) Foreign Application Priority Data

Dec. 25, 2019 (JP) .............................. JP2019-235045

(51) Int. Cl.
*H04N 1/04* (2006.01)
*H04N 1/00* (2006.01)

(52) U.S. Cl.
CPC ..... *H04N 1/00748* (2013.01); *H04N 1/00737* (2013.01)

(58) Field of Classification Search
None
See application file for complete search history.

(56) References Cited

U.S. PATENT DOCUMENTS

| 5,245,440 | A  | * | 9/1993  | Sato     | H04N 1/0473  |
|           |    |   |         |          | 358/406      |
| 7,099,054 | B2 | * | 8/2006  | Shih     | H04N 1/047   |
|           |    |   |         |          | 358/474      |
| 2002/0149802 | A1 | * | 10/2002 | Aoki  | H04N 1/401   |
|           |    |   |         |          | 358/461      |
| 2009/0009824 | A1 | * | 1/2009  | Nakayama | H04N 1/00063 |
|           |    |   |         |          | 358/474      |
| 2020/0322497 | A1 | * | 10/2020 | Kanno | H04N 1/00631 |

FOREIGN PATENT DOCUMENTS

| JP | H04-111670 A | 4/1992 |
| JP | 2000-201255 A | 7/2000 |
| JP | 2016-152564 A | 8/2016 |
| JP | 2017-108219 A | 6/2017 |

* cited by examiner

*Primary Examiner* — Cheukfan Lee
(74) *Attorney, Agent, or Firm* — Workman Nydegger

(57) ABSTRACT

In an image reading apparatus, a controller detects a plurality of detection points along a first edge, sets one of the detection points arranged along the first edge which is closest to a center of a sheet placement area in a second axial direction, and determines a reference read position in the second axial direction, based on the selected detection point. Furthermore, the controller detects a plurality of detection points along a second edge, sets one of the detection points arranged along the second edge which is closest to a center of the sheet placement area in a first axial direction, and determines a reference read position in the first axial direction, based on the selected detection point.

7 Claims, 13 Drawing Sheets

IMAGE READING APPARATUS

The present application is based on, and claims priority from JP Application Serial Number 2019-235045, filed Dec. 25, 2019, the disclosure of which is hereby incorporated by reference herein in its entirety.

BACKGROUND

1. Technical Field

The present disclosure relates to an image reading apparatus that reads an image on a sheet.

2. Related Art

One example of image reading apparatuses is flat-bed-type scanners, in which a reader with a photoelectric device, such as an image sensor, scans an image on a sheet while moving in predetermined directions (see JP-A-2016-152564). To read an image on a sheet with a scanner of this type, a user places this sheet within a sheet placement area defined by a surrounding frame member with one corner of the sheet being positioned at a reference corner of the frame member, and then closes the sheet cover. In this case, the sheet is pressed against the sheet placement area by a sheet mat bonded to the rear surface of the sheet cover. Then, the user presses the scan button and in response to this, the scanner reads the image.

Due to some manufacturing and assembly errors, the positions of the sides of the frame member may be shifted from their design positions. In addition, each of those sides may be angled in the main-scanning direction or the sub-scanning directions. In which case, the scanner might read not only the image on the sheet but also the rear surface of the frame member. To avoid this disadvantage, it is necessary to reserve the read area sufficiently inside the design positions of the sides of the frame member. In terms of safety, it is preferable to set the read area widely apart from the design positions of the sides of the frame member, but this setting is prone to increase the risk of the sheet placed outside the read area, in which case the resultant read image may have a missing area.

When the sheet cover is closed, there is a gap between the frame member and the sheet mat. Thus, the rear surface of a sheet placed within the sheet placement area has two regions: the first region in which the sheet mat is present, and the second region in which the sheet mat is not present. The first region helps an increase in luminance whereas the second region helps a decrease in luminance, which makes the luminance of the resultant read image non-uniform. To avoid such disadvantages of lowered quality, it is necessary to reserve the read area sufficiently inside the design positions of the sides of the sheet mat, so that the read area is reliably positioned inside actual positions of the sides of the sheet mat. Due to some manufacturing and assembly errors, however, the positions of the sides of the sheet mat may be shifted from their design positions. In addition, each of those sides may be angled in the main-scanning direction or the sub-scanning directions. To avoid this disadvantage and in terms of safety, it is preferable to set the read area widely apart from the design positions of the sides of the sheet mat, but this setting is prone to increase the risk of the sheet placed outside the read area, in which case the resultant read image may have a missing area.

SUMMARY

The present disclosure is an image reading apparatus that includes a sheet placement section in which a sheet to be read is placed. A reader is disposed to extend in a first axial direction, which reads the sheet placed in the sheet placement section during a movement of the reader in a second axial direction that intersects the first axial direction. A frame member includes: a first frame that has a first edge extending in the first axial direction; and a second frame that has a second edge extending in the second axial direction. Both of the first edge and the second edge define a sheet placement area in the sheet placement section. A controller controls the reader. The controller detects a plurality of detection points along the first edge, sets a detection point from the plurality of detection points arranged along the first edge, the selected detection point being closest to a center of the sheet placement area in the second axial direction, and determines a reference read position in the second axial direction, based on the selected detection point. Moreover, the controller detects a plurality of detection points along the second edge, sets a detection point from the plurality of detection points arranged along the second edge, the selected detection point being closest to a center of the sheet placement area in the first axial direction, and determines a reference read position in the first axial direction, based on the selected detection point.

BRIEF DESCRIPTION OF THE DRAWINGS

FIG. 7 is a flowchart of a process performed by the controller when the printer is powered on.

DESCRIPTION OF EXEMPLARY EMBODIMENTS

Figure 1:
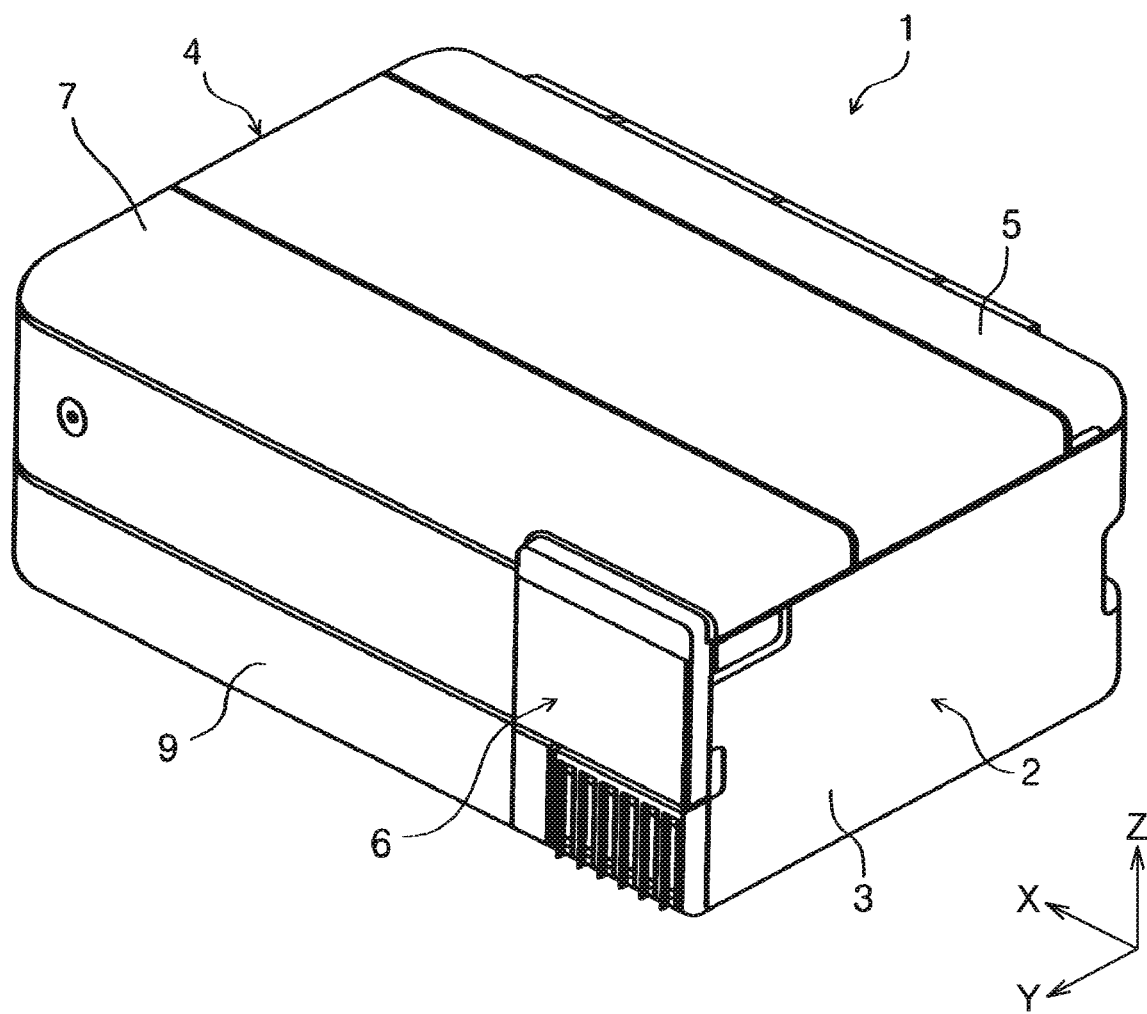
FIG. 1 is a perspective view of an appearance of a printer according to an embodiment of the present disclosure.

Some aspects of the present disclosure will be described below.

According to a first aspect, an image reading apparatus includes a sheet placement section in which a sheet to be read is placed. A reader is disposed to extend in a first axial direction, which reads the sheet placed in the sheet placement section during a movement of the reader in a second axial direction that intersects the first axial direction. A frame member includes: a first frame that has a first edge extending in the first axial direction; and a second frame that has a second edge extending in the second axial direction. Both of the first edge and the second edge define a sheet placement area in the sheet placement section. A controller controls the reader. The controller detects a plurality of detection points along the first edge, sets a detection point from the plurality of detection points arranged along the first edge, the selected detection point being closest to a center of the sheet placement area in the second axial direction, and determines a reference read position in the second axial direction, based on the selected detection point. Moreover, the controller detects a plurality of detection points along the second edge, sets a detection point from the plurality of detection points arranged along the second edge, the selected detection point being closest to a center of the sheet placement area in the first axial direction, and determines a reference read position in the first axial direction, based on the selected detection point.

In the first aspect, as described above, the controller detects a plurality of detection points along the first edge, sets a detection point from the plurality of detection points arranged along the first edge, the selected detection point being closest to a center of the sheet placement area in the second axial direction, and determines a reference read position in the second axial direction, based on the selected detection point. Moreover, the controller detects a plurality of detection points along the second edge, sets a detection point from the plurality of detection points arranged along the second edge, the selected detection point being closest to a center of the sheet placement area in the first axial direction, and determines a reference read position in the first axial direction, based on the selected detection point. With this configuration, it is unnecessary to reserve a read area widely apart from the frame member 11, as opposed to the case where the read image is defined equally in consideration of production tolerances. Consequently, the image reading apparatus successfully provides a read image with no or a small missing area.

According to a second aspect, in the image reading apparatus of the foregoing first aspect, the plurality of detection points arranged along the first edge may include a first detection point and a second detection point. The plurality of detection points arranged along the second edge may include a third detection point and a fourth detection point.

In the second aspect, as described above, the plurality of detection points arranged along the first edge may include a first detection point and a second detection point. The plurality of detection points arranged along the second edge may include a third detection point and a fourth detection point. This configuration successfully produces substantially the same effects as the configuration in the foregoing first aspect.

According to a third aspect, the image reading apparatus of the foregoing second aspect may further include: a press member that presses the sheet placed in the sheet placement area; and a cover member that covers the sheet placement area. Both of the first detection point and the second detection point may be set on a first side of the press member, the first side facing the first edge. Both of the third detection point and the fourth detection point may be set on a second side of the press member, the second side facing the second edge. A read area for the reader may be defined within an area of the press member.

In the third aspect, as described above, both of the first detection point and the second detection point may be set on a first side of the press member, the first side facing the first edge. Both of the third detection point and the fourth detection point may be set on a second side of the press member, the second side facing the second edge. A read area for the reader may be defined within an area of the press member. With this configuration, the image reading apparatus helps reduce non-uniform luminance of the rear surface of a sheet to be read, thereby successfully providing a quality read image.

According to a fourth aspect, in the image reading apparatus of one of the foregoing first to third aspects, when one or both of the reference read positions in the first axial direction and the second axial direction are set outside a predetermined area, the controller may perform an error process.

In the fourth aspect, as described above, when one or both of the reference read positions in the first axial direction and the second axial direction are set outside a predetermined area, the controller may perform an error process. This configuration successfully reduces the risk of providing improper reference read positions.

According to a fifth aspect, in the image reading apparatus of the foregoing third aspect, the press member may have a white color, and a surface of the cover which faces the sheet placement area may have a black portion around the press member.

In the fifth aspect, as described above, the press member may have a white color, and a surface of the cover which faces the sheet placement area may have a black portion around the press member. This configuration successfully accurately detects the sides of the press member, namely, the first detection point, the second detection point, the third detection point, and the fourth detection point.

According to a sixth aspect, in the image reading apparatus of the foregoing second aspect, both of the first detection point and the second detection point may be set on the first frame. Both of the third detection point and the fourth detection point may be set on the second frame.

In the sixth aspect, as described above, both of the first detection point and the second detection point may be set on the first frame, and both of the third detection point and the fourth detection point may be set on the second frame. This configuration successfully produces substantially the same effects as the configuration in the foregoing first aspect.

According to a seventh aspect, in the image reading apparatus of the foregoing second aspect, all of the first detection point, the second detection point, the third detection point, and the fourth detection point may be set on a sheet member disposed in the sheet placement area.

In the seventh aspect, as described above, when all of the first detection point, the second detection point, the third detection point, and the fourth detection point are set on a sheet member disposed in the sheet placement area, this configuration successfully produces substantially the same effects as the configuration in the foregoing first aspect.

With reference to the accompanying drawings, a description will be given below of an ink jet printer 1, referred to below simply as a printer 1, that includes a scanner unit 4. Herein, the printer 1 serves as a recording apparatus, and the scanner unit 4 serves as an image reading apparatus. Each individual drawing employs an X-Y-Z coordinate system in which the X-axis is parallel to the width of the printer 1, the Y-axis is parallel to the depth of the printer 1, and the Z-axis is parallel to the height of the printer 1. Further, the direction from the right to the left of the printer 1 as viewed from the front is defined as the +X direction, whereas the direction from the left to the right of the printer 1 as viewed from the front is defined as the −X direction. The direction from the rear to the front of the printer 1 is defined as the +Y direction, whereas the direction from the front to the rear of the printer 1 is defined as the −Y direction. The upward direction is defined as the +Z direction, whereas the downward direction is defined as the −Z direction. Herein, the ±X directions correspond to the sub-scanning directions of the scanner unit 4, which are examples of a second axial direction, and the +Y direction corresponds to a main-scanning direction of the scanner unit 4, which is an example of a first axial direction.

Figure 2:
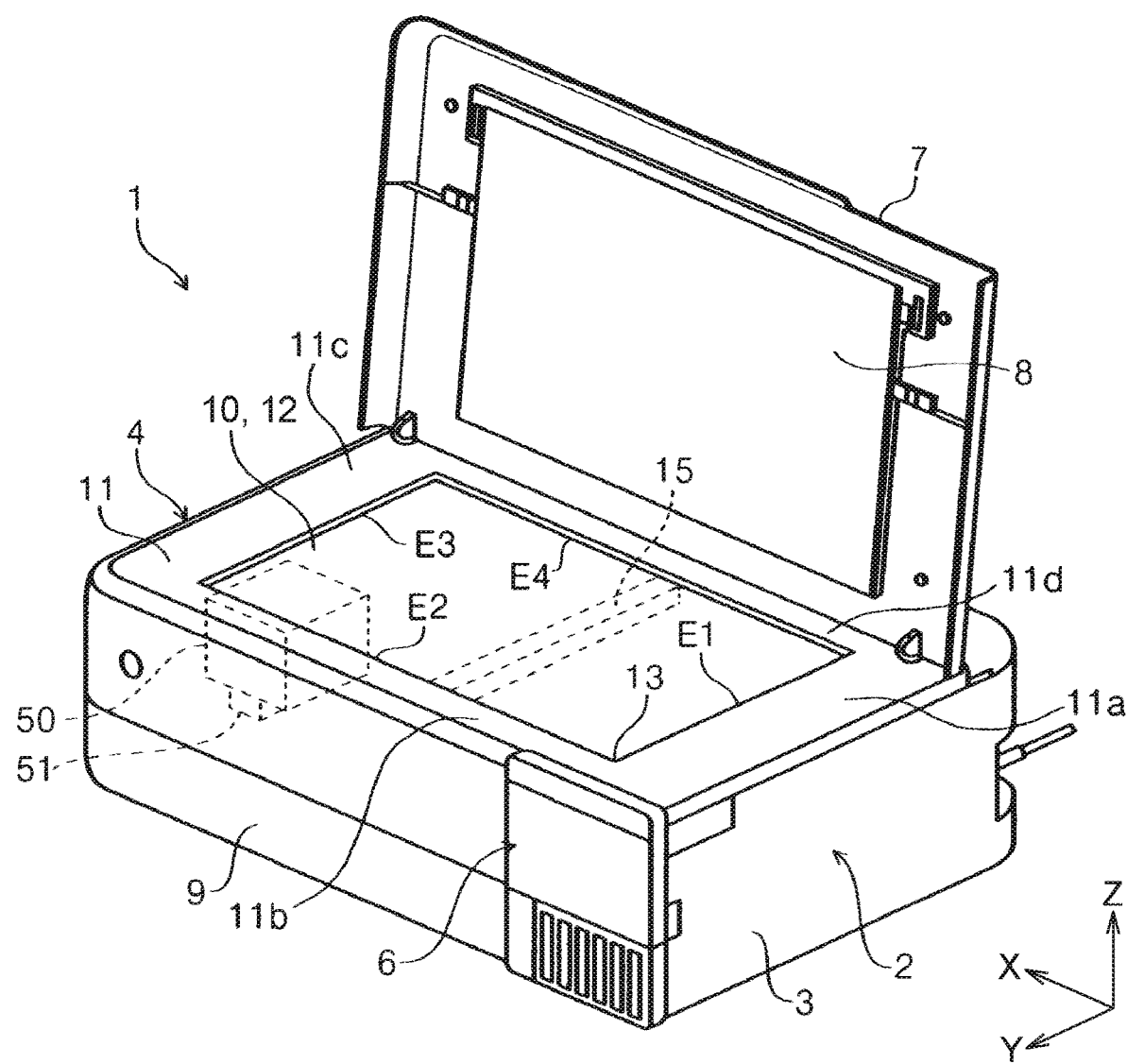
FIG. 2 is a perspective view of the appearance of the printer with its sheet cover opened.

As illustrated in FIGS. 1 and 2, the printer 1 includes a recording unit 2 and the scanner unit 4; the recording unit 2 is a main body that contains a recording head 51 that records information on a medium, and the scanner unit 4 that reads an image on a sheet is disposed above the recording unit 2. In this embodiment, the printer 1 may be implemented by a multifunction peripheral (MFP) that has a recording function and an image reading function; an example of the medium is a recording sheet. The recording head 51 is disposed on a carriage 50, which discharges ink onto the medium while the carriage 50 is moving in the ±X directions, thereby recording information on the medium.

The contour of the recording unit 2 is defined by a casing 3. Disposed on the rear portion of the recording unit 2 is a supply port cover 5 in an openable and closable manner. When the supply port cover 5 is open, a medium supply port (not illustrated) is exposed. The scanner unit 4, which is disposed above the recording unit 2, has a rotating shaft (not illustrated) on the rear side, or −Y side, of the printer 1. Around this rotating shaft, the sheet cover 7 is rotatable with its front side, or the +Y side, being a free end. By rotating the sheet cover 7 toward the −Y side, the upper portion of the recording unit 2 is exposed. By rotating the sheet cover 7 toward the +Y side, the upper portion of the recording unit 2 is hidden.

The scanner unit 4 has an operation panel 6, which is disposed on the front surface of the printer 1. The operation panel 6 allows the user to, for example, make various settings, perform a recording operation and an image reading operation, and display the settings and a preview screen of an image to be read. Disposed in the lower portion of the front surface of the recording unit 2 is a front cover 9 in an openable and closable manner. By opening the front cover 9, a medium tray and an ejection tray (both not illustrated) are exposed. In the medium tray, media on which information is to be recorded are accommodated; in the ejection tray, media on which the information has been recorded are accommodated.

Figure 9:
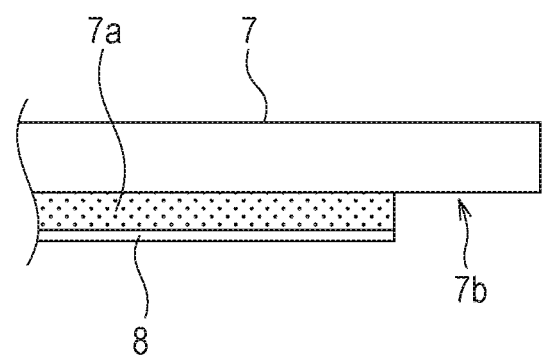
FIG. 9 is a partial side view of the sheet cover and the sheet mat.

Next, a configuration of the scanner unit 4 will be described below in detail. The scanner unit 4 includes a sheet cover 7, which is attached to the scanner unit 4 via a hinge (not illustrated) disposed on the −Y side so that the sheet cover 7 is rotatable relative to the scanner unit 4. Herein, the sheet cover 7 serves as a cover member. By rotating the sheet cover 7, a sheet placement area 12 formed in a sheet glass table 10 is exposed as illustrated in FIG. 2 or hidden as illustrated in FIG. 1. Herein, the sheet placement area 12 serves as a sheet placement section. On the inner side of the sheet cover 7 is a sheet mat 8, which serves as a press member herein. When the sheet cover 7 is closed with a sheet placed on the sheet glass table 10, the sheet mat 8 presses this sheet against the sheet glass table 10. Disposed between the sheet mat 8 and the sheet cover 7 is an elastic member 7a, as illustrated in FIG. 9.

Figure 12:
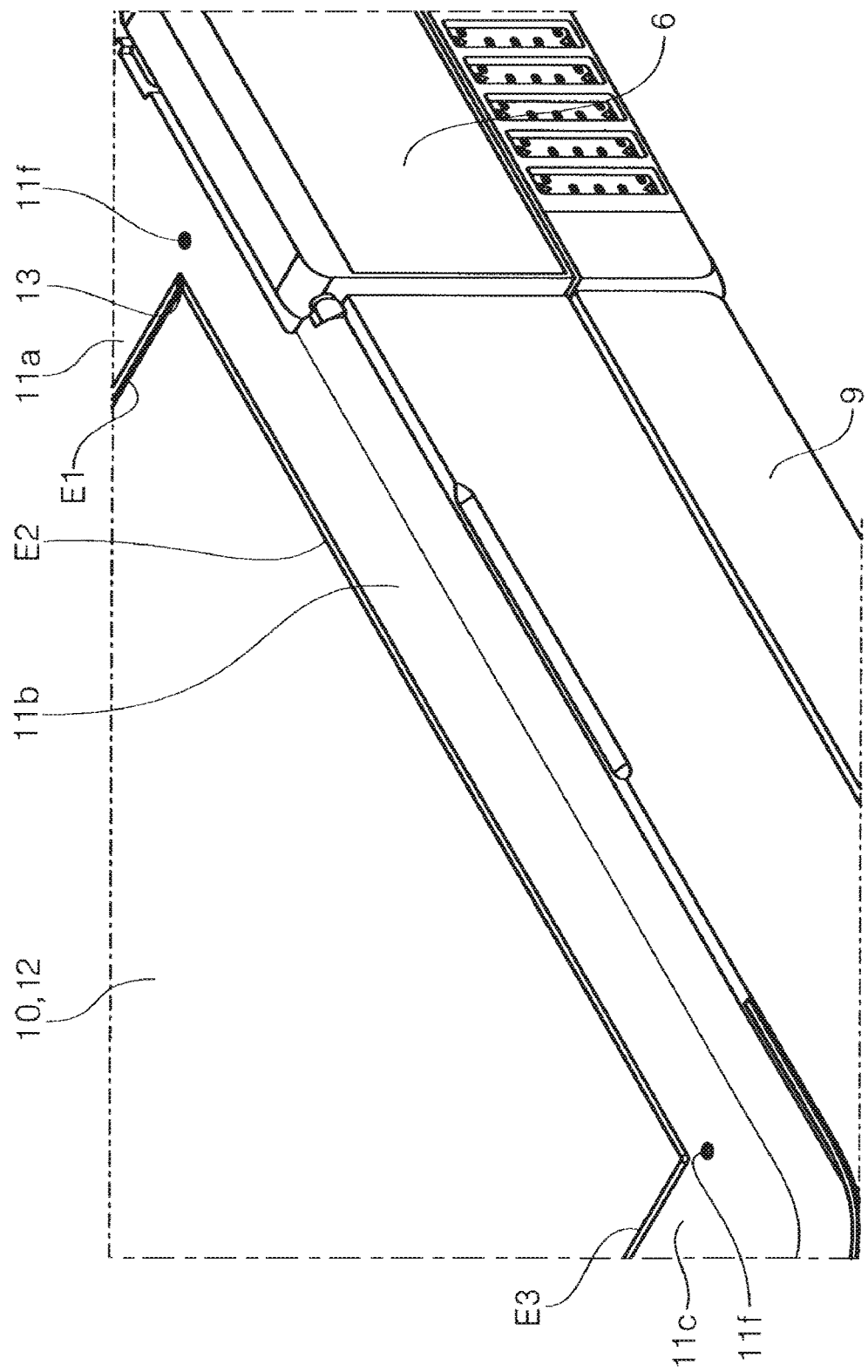
FIG. 12 is a partial enlarged perspective view of the printer with its sheet cover opened.
Figure 13:
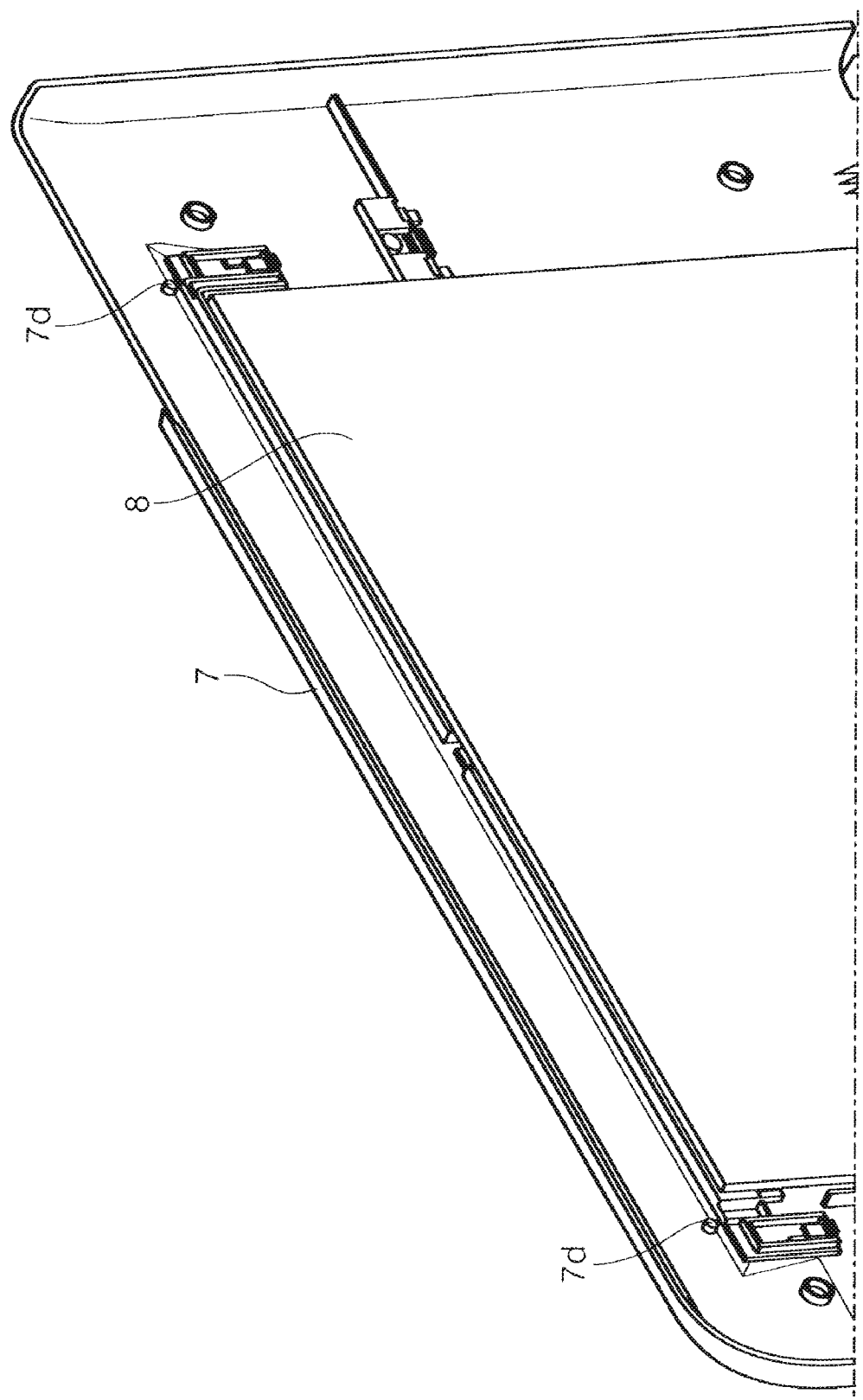
FIG. 13 is a partial enlarged perspective view of the rear surface of the sheet cover.

The scanner unit 4 further includes a frame member 11 with two recesses 11f, as illustrated in FIG. 12. The sheet cover 7 has two projections 7d on its inner side, as illustrated in FIG. 13. When the sheet cover 7 is closed, the projections 7d are inserted into the corresponding recesses 11f. With this configuration, the sheet mat 8 is positioned relative to the frame member 11.

The frame member 11 defines the sheet placement area 12 on the sheet glass table 10. The reference character 11a denotes a first frame that is disposed on the −X side and extends along the Y-axis; the reference character 11b denotes a second frame that is disposed on the +Y side and extends along the X-axis; the reference character 11c denotes a third frame that is disposed on the +X side and extends along the Y-axis; and the reference character 11d denotes a fourth frame that is disposed on the −Y side and extends along the X-axis. All of the first frame 11a, the second frame 11b, the third frame 11c, and the fourth frame 11d are integrated to constitute the frame member 11. The first frame 11a has a first edge E1 extending along the Y-axis; the second frame 11b has a second edge E2 extending along the X-axis; the third frame 11c has a third edge E3 extending along the Y-axis; and the fourth frame 11d has a fourth edge E4 extending along the X-axis. The first edge E1, the second edge E2, the third edge E3, and the fourth edge E4 correspond to the respective sides of the sheet placement area 12 having a rectangular shape.

The first edge E1 intersects the second edge E2 at a reference corner 13, which is disposed close to reference read positions at which the read operation starts. When the user places a sheet within the sheet placement area 12, one corner of this sheet is positioned at the reference corner 13.

The scanner unit 4 further includes a read sensor 15 under the sheet glass table 10. The read sensor 15 is a reader that reads an image on a sheet, which is disposed so as to extend along the Y-axis or in the main-scanning direction. In this embodiment, the read sensor 15 may be a contact image sensor (CIS). The contour of the read sensor 15 is defined by a carriage 15a, as illustrated in FIG. 3, and the carriage 15a is movable along the X-axis, or in the sub-scanning directions, by means of the power from a motor 21; herein, the motor 21 serves as a drive source.

Figure 3:
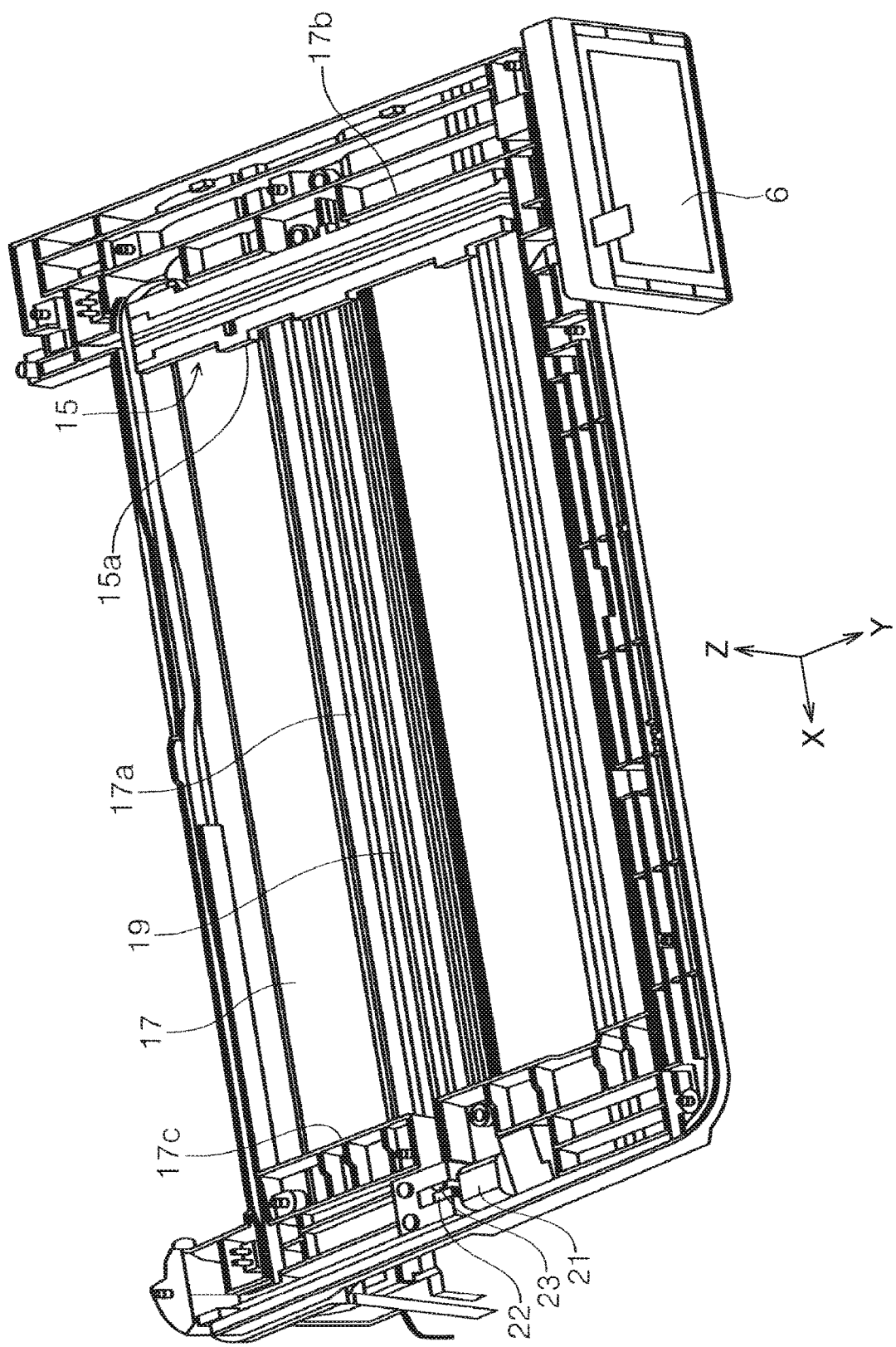
FIG. 3 is a perspective view of the interior of the scanner.

The scanner unit 4 further includes a base frame 17 and a guide rail 17a that are integrated with each other, as illustrated in FIG. 3; the guide rail 17a extends along the X-axis. The carriage 15a, which defines the counter of the read sensor 15, is movable along the X-axis while guided by the guide rail 17a.

The motor 21, which serves as a drive source for the read sensor 15, is disposed within a predetermined region on the +X side. The rotating shaft of the motor 21 is provided with a worm gear 22. The motor 21 transmits the drive power to a drive belt 19 via a spur gear 23 engaging with the worm gear 22. The drive belt 19 extends along the X-axis with its one end fixed to the carriage 15a. This configuration enables the read sensor 15 to move along the X-axis.

The base frame 17 includes a wall 17b on the −X side and a wall 17c on the +X side; both of the walls 17b and 17c extend along the Y-axis. The wall 17b restricts the movement of the read sensor 15 in the −X direction, whereas the wall 17c restricts the movement of the read sensor 15 in the +X direction. Further, the wall 17b restricts the region along the X-axis in which the origin position of the read sensor 15 is set.

Figure 4:
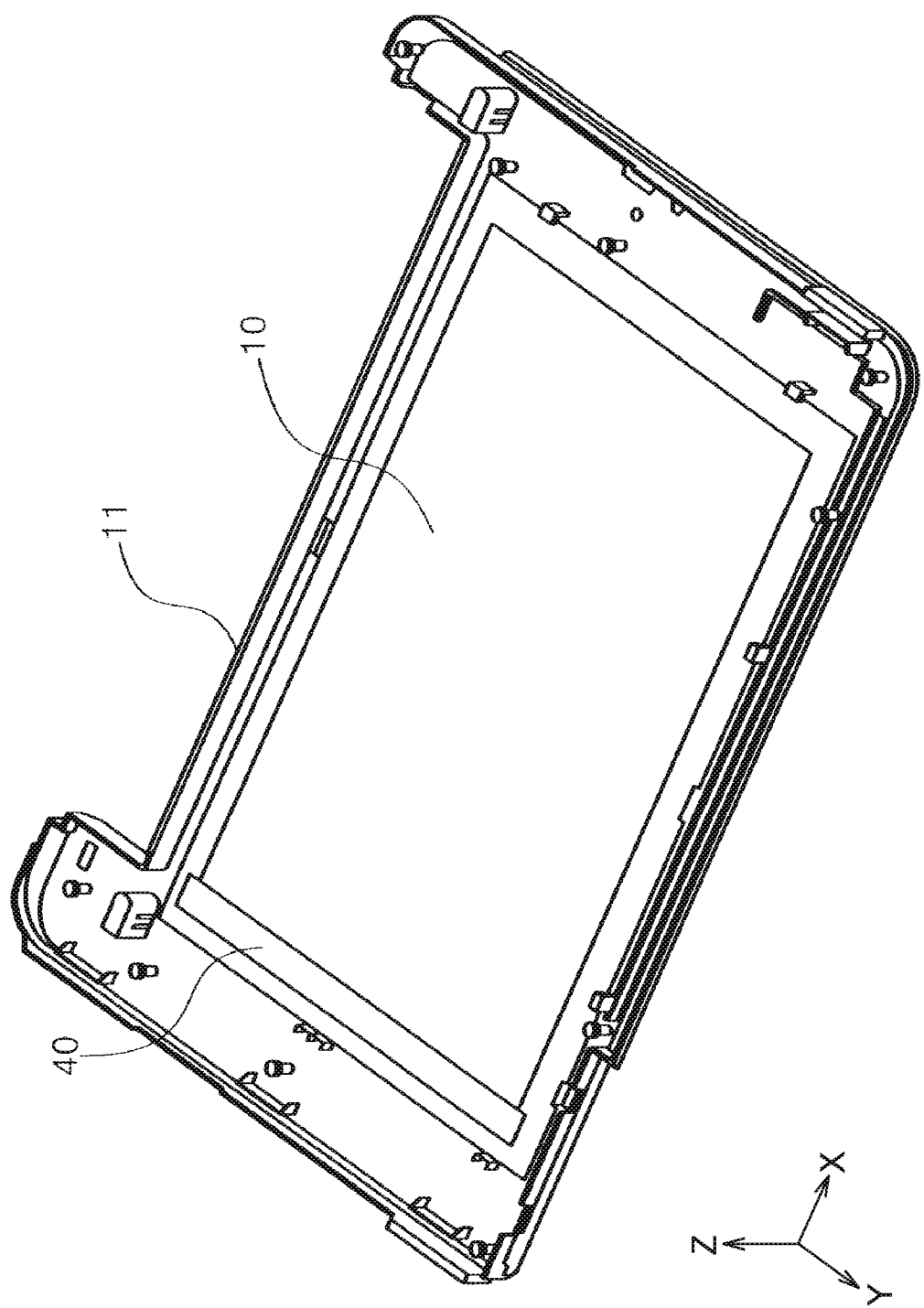
FIG. 4 is a perspective view of the frame member as viewed from the below.
Figure 5:
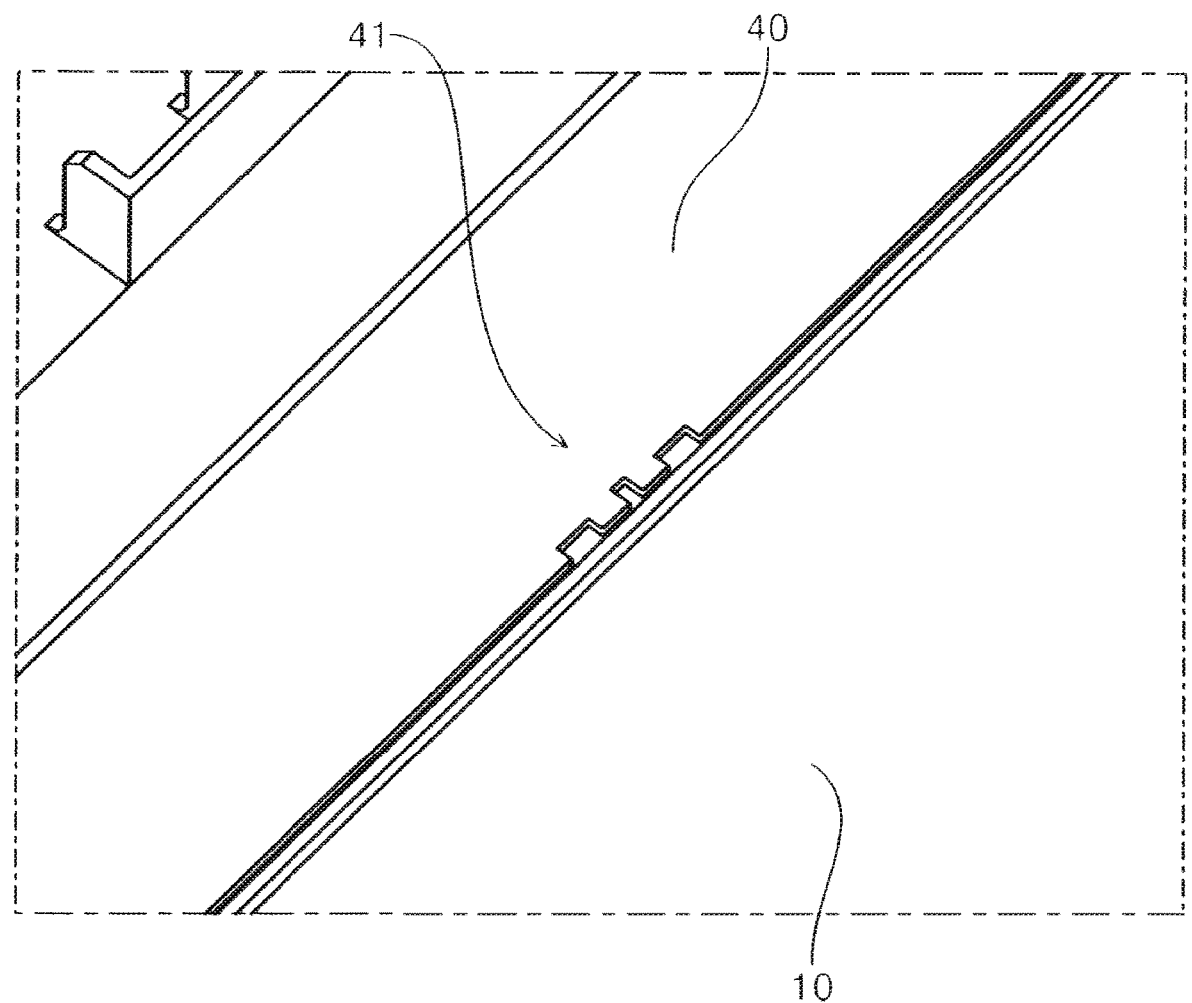
FIG. 5 is a perspective view of the origin detection mark.

The scanner unit 4 further includes a white reference section 40 used for shading correction, which is disposed on the rear surface of the first frame 11a of the frame member 11, as illustrated in FIG. 4. The white reference section 40 is disposed outside the sheet placement area 12 as illustrated in FIG. 2. The white reference section 40 is provided with an origin detection mark 41 as illustrated in FIG. 5. The read sensor 15 detects the origin detection mark 41 and a plurality of detection points that will be described later, thereby setting reference read positions on the X and Y axes. The method of setting the reference read positions will be described later.

Figure 6:
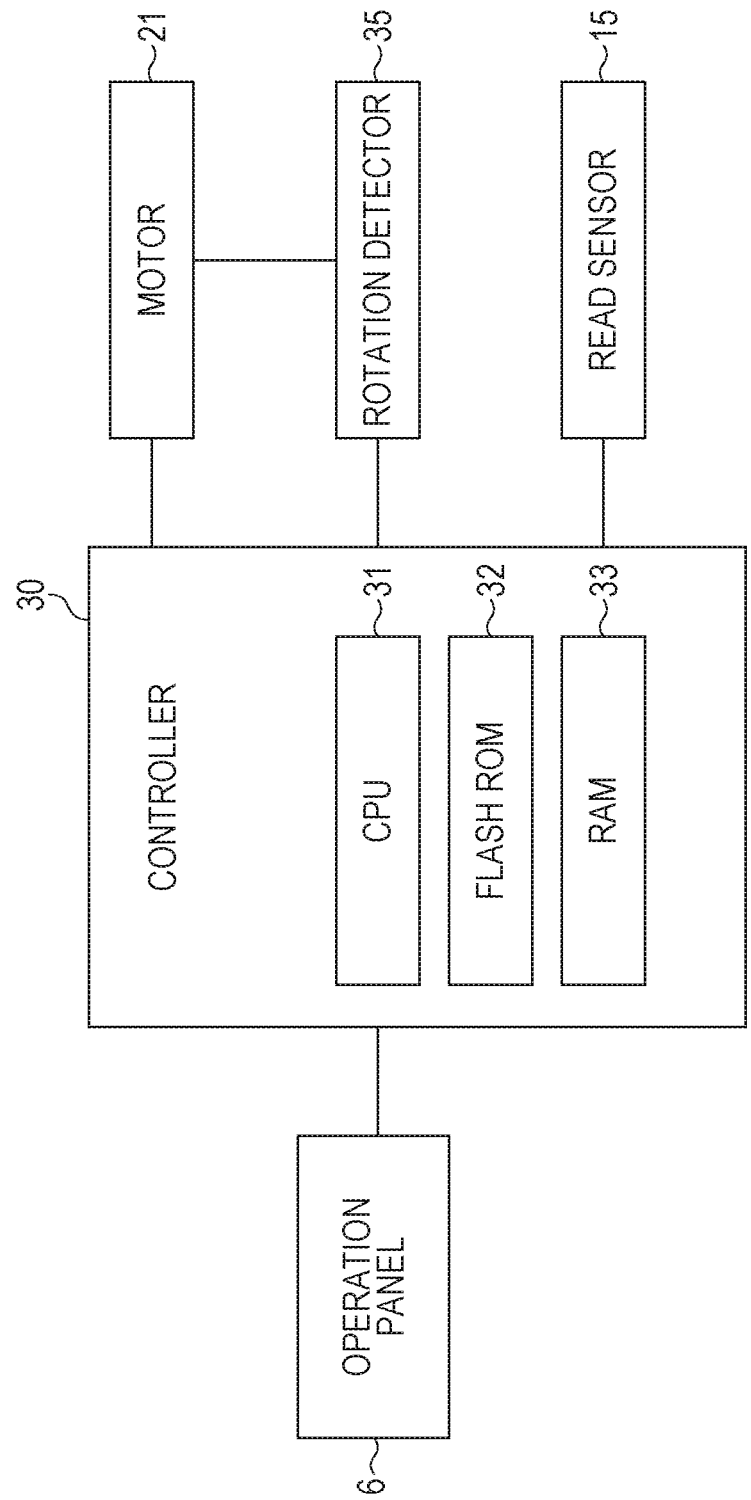
FIG. 6 is a block diagram of a control system in the scanner.

The rotating shaft of the motor 21 (see FIG. 3) is provided with a rotary encoder (not illustrated) and an optical detector (not illustrated) that reads this rotary encoder. Both of the rotary encoder and the optical detector constitute a rotation detector 35, as illustrated in FIG. 6, which transmits a pulse signal to a controller 30 in accordance with the rotation of the motor 21. In this way, the controller 30 calculates the number of rotations of the motor 21, or a driven amount of the read sensor 15 along the X-axis, and then locates the read sensor 15 on the X-axis, based on the calculated driven amount.

The controller 30 controls various operations of the printer 1, including the reading of an image on a sheet by the scanner unit 4, the recording of information by the recording unit 2, and the transporting of the sheet by the recording unit 2. It should be noted that FIG. 6 illustrates only the main components in the scanner unit 4 and thus does not illustrate the components in the recording unit 2. When receiving a signal from the operation panel 6, the controller 30 transmits a signal for use in realizing a display in the operation panel 6 and a user interface (UI) to the operation panel 6.

The controller 30 controls an operation of the motor 21, which may be a direct current (DC) motor in this embodiment. When receiving read data from the read sensor 15, the controller 30 transmits a control signal to the read sensor 15. The controller 30 includes a central processing unit (CPU) 31, flash read-only memory (ROM) 32, and random access memory (RAM) 33. The CPU 31 performs various arithmetic processes in accordance with programs stored in the flash ROM 32 and controls all operations of the printer 1. The flash ROM 32, which serves as a storage unit herein, may be a nonvolatile readable and writable memory. Various setting information that the user has input via the operation panel 6 is stored in the flash ROM 32. Various information is also temporarily stored in the RAM 33, which is an example of a storage unit.

Figure 7:
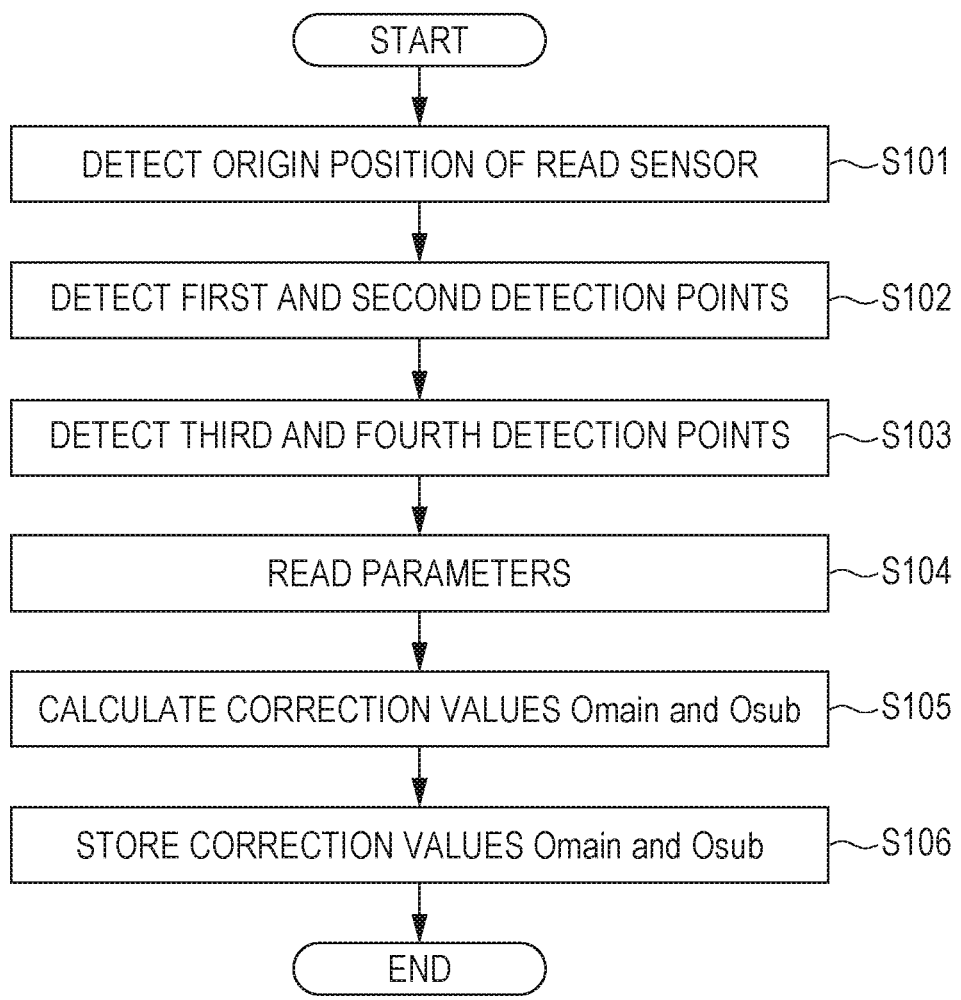

Next, with reference to FIG. 7 and some other subsequent drawings, a description will be given of a reference read position setting mode, which is also referred to below simply as a reference position setting mode. At the power-on of the printer 1, the controller 30 operates in the reference position setting mode as illustrated in FIG. 7. However, the timing at which the controller 30 operates in the reference position setting mode is not limited to the power-on. Alternatively, the controller 30 may operate in the reference position setting mode during an assembly process and thus does not necessarily have to operate in this mode during a user's operation of the printer 1. At Step S101 in FIG. 7, the controller 30 detects an origin position of the read sensor 15. More specifically, in response to the power-on of the printer 1, the controller 30 moves the read sensor 15 in the −X direction and then detects an elevated value of the drive current flowing to the motor 21 (see FIG. 6) when the read sensor 15 makes contact with the wall 17b (see FIG. 3).

Figure 8:
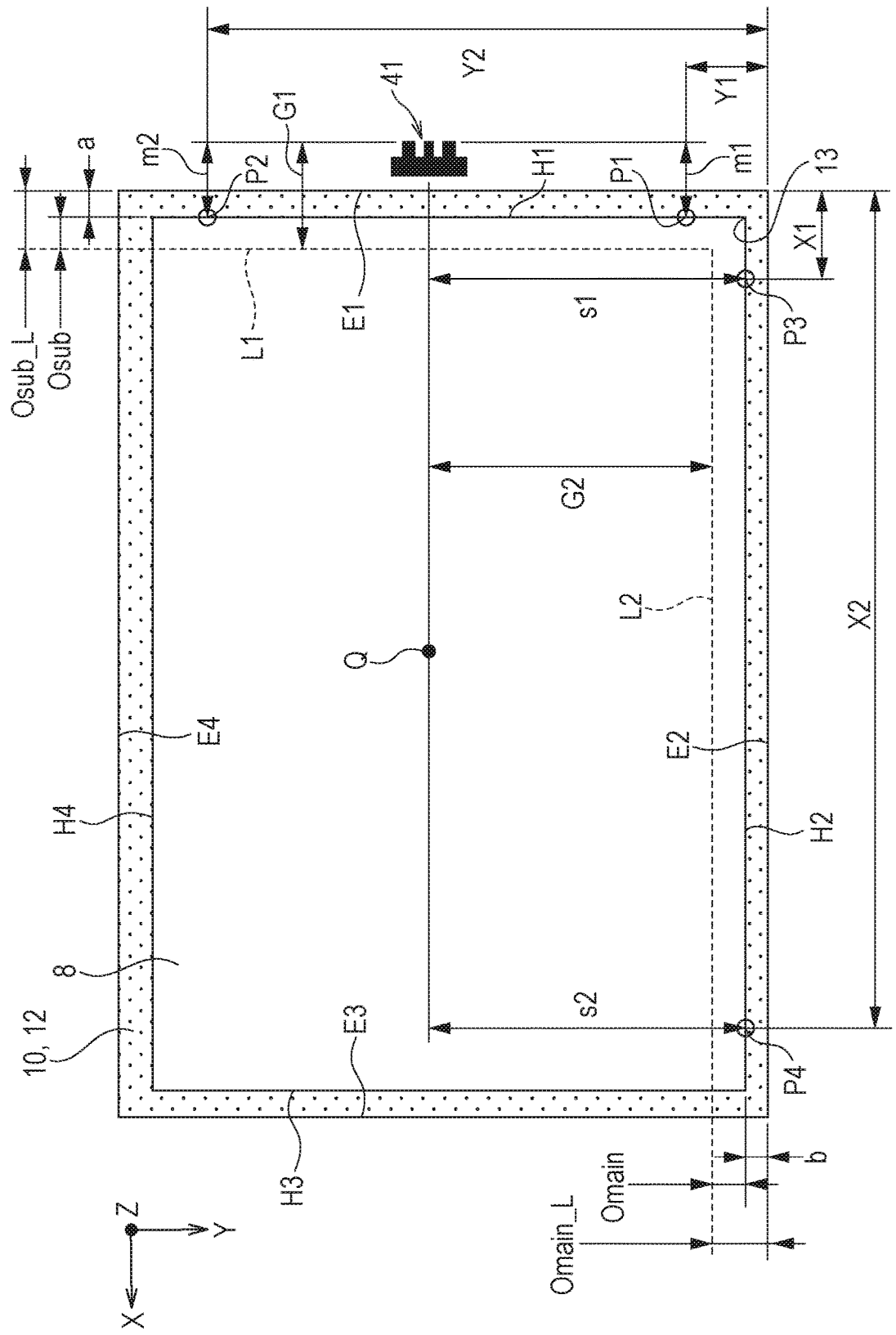
FIG. 8 illustrates a positional relationship of the origin detection mark and first, second, third, and fourth detection points.

At Step S102, the controller 30 detects a first detection point P1 and a second detection point P2. As illustrated in FIG. 8, both of the first detection point P1 and the second detection point P2 are set on a first side H1 of the sheet mat 8 which faces the first edge E1 of the first frame 11a. In short, the controller 30 detects the two points arranged at a predetermined interval along the Y-axis in order to locate the first side H1 on the X-axis. It should be noted that both of the first detection point P1 and the second detection point P2 are positioned at one edge of the sheet mat 8 although they are denoted by circles for the sake of convenience as illustrated in FIG. 8. In FIG. 8, the distance along the Y-axis between a design position of the second edge E2 and an actual position of the first detection point P1 is represented by a distance Y1. Likewise, the distance along the Y-axis between the design position of the second edge E2 and an actual position of the second detection point P2 is represented by a distance Y2.

At Step S103, the controller 30 detects a third detection point P3 and a fourth detection point P4. As illustrated in FIG. 8, both of the third detection point P3 and the fourth detection point P4 are set on a second side H2 of the sheet mat 8 which faces the second edge E2 of the second frame 11b. In short, the controller 30 detects the two points arranged at a predetermined interval along the X-axis in order to locate the second side H2 on the Y-axis. It should be noted that both of the third detection point P3 and the fourth detection point P4 are positioned at one edge of the sheet mat 8 although they are denoted by circles for the sake of convenience as illustrated in FIG. 8. In FIG. 8, the distance along the X-axis between a design position of the first edge E1 and an actual position of the third detection point P3 is represented by a distance X1. Likewise, the distance along the X-axis between the design position of the first edge E1 and an actual position of the fourth detection point P4 is represented by a distance X2.

Referring to FIG. 7 again, at Step S104, the controller 30 reads parameters for use in calculating correction values Omain and Osub, from a flash ROM 32 (see FIG. 6). In this case, the correction value Omain is used to correct a reference read position on the Y-axis, or in the main-scanning direction, whereas the correction value Osub is used to correct a reference read position on the X-axis, or in the sub-scanning directions. At Step S105, the controller 30 calculates the correction values Omain and Osub. At Step S106, the controller 30 stores the calculated correction values Omain and Osub in the flash ROM 32 (see FIG. 6).

With reference to FIG. 8, a description will be given below of the method of calculating the correction values Omain and Osub. In FIG. 8, the distance along the X-axis between the edge of the origin detection mark 41 in the −X direction and the first detection point P1, or the first side H1, is represented by a distance m1. Likewise, the distance along the X-axis between the edge of the origin detection mark 41 in the −X direction and the second detection point P2, or the first side H1, is represented by a distance m2. Then, the controller 30 selects a longer one of the distances m1 and m2 and designates the selected one as a distance md. In other words, the controller 30 uses one of the first detection point P1 and the second detection point P2 which is closer to a center position Q of the sheet placement area 12 on the X-axis to calculate the reference read positions. For example, if the distance m1 is longer than the distance m2 due to an inclination of the first side H1, the controller 30 selects the distance m1 as the distance md. In this case, the first detection point P1 and the second detection point P2 are preferably symmetrical to each other along the Y-axis with respect to the center position Q of the sheet placement area 12. Furthermore, the first detection point P1 is more preferably positioned closer to the second side H2 of the sheet mat 8. Likewise, the second detection point P2 is more preferably positioned closer to a fourth side H4 of the sheet mat 8.

The distance along the Y-axis between the center position of the origin detection mark 41 on the Y-axis and the third detection point P3, or the second side H2, is represented by a distance s1. Likewise, the distance along the Y-axis between the center position of the origin detection mark 41 on the Y-axis and the fourth detection point P4, or the second side H2, is represented by a distance s2. Then, the controller 30 selects a shorter one of the distances s1 and s2 and designates the selected one as a distance sd. In short, the controller 30 uses one of the third detection point P3 and the fourth detection point P4 which is closer to the center position Q of the sheet placement area 12 on the Y-axis to calculate the reference read positions. For example, if the distance s1 is shorter than the distance s2 due to an inclination of the second side H2, the controller 30 selects the distance s1 as the distance sd. In this case, the third detection point P3 and the fourth detection point P4 are preferably symmetrical to each other along the X-axis with respect to the center position Q of the sheet placement area 12. Furthermore, the third detection point P3 is more preferably positioned closer to the first side H1 of the sheet mat 8. Likewise, the fourth detection point P4 is more preferably positioned closer to a third side H3 of the sheet mat 8.

In FIG. 8, a dotted straight line L1 represents a provisional reference read position in the sub-scanning directions, whereas a dotted straight line L2 represents a provisional reference read position in the main-scanning direction. The dotted straight line L1 is substantially parallel to the main-scanning direction and positioned a distance G1 apart from the edge of the origin detection mark 41 in the −X direction. Likewise, the dotted straight line L2 is substantially parallel to the sub-scanning directions and positioned a distance G2 apart from the center position of the origin detection mark 41 in the +Y direction. The distances G1 and G2 may be temporarily preset so that the dotted straight lines L1 and L2 are reliably positioned within the area of the sheet mat 8 even with assumed manufacturing and installation errors of the sheet mat 8 maximized. The controller 30 may prestore the distances G1 and G2 in the flash ROM 32 (see FIG. 6) as parameters. If both of the correction values Omain and Osub, details of which will be described later, become zero, the controller 30 may set the reference read positions on the dotted straight line L1 and L2.

The distance along the X-axis between the first edge E1 and the first side H1 is represented by a distance a, whereas the distance along the Y-axis between the second edge E2 and the second side H2 is represented by a distance b. The controller 30 may store the distances a and b in the flash ROM 32 (see FIG. 6) as parameters of preset design values.

The controller 30 calculates the correction values Omain and Osub by using following equations (1) and (2):

$$O\mathrm{main}=sd-G2 \quad (1), \text{ and}$$

$$O\mathrm{sub}=G1-md \quad (2),$$

where sd denotes a shorter one of the distances s1 and s2, and md denotes a longer one for the distances m1 and m2.

Before the printer 1 starts the scanning operation, the controller 30 sets the reference read position relative to the position of the origin detection mark 41 in the main-scanning direction to (G2+Omain) and also sets the reference read position relative to the position of the origin detection mark 41 in the sub-scanning directions to (G1−Osub).

If the correction value Omain obtained as the result of the calculation using equation (1) becomes negative, the controller 30 may output an alert instead of employing the correction value Omain. Likewise, if the correction value Osub as the result of the calculation using equation (2) becomes negative, the controller 30 may output an alert instead of employing the correction value Osub. When one or both of the correction values Omain and Osub become negative, the sheet mat 8 is considered to be inclined beyond its allowable angle or be shifted beyond its allowable amount.

In the above way, the controller 30 can reliably set the reference read positions within the area of the sheet mat 8 and maximally close to the first side H1 and the second side H2 of the sheet mat 8.

As described above, the controller 30 detects a plurality of detection points arranged at predetermined intervals at the first edge E1. Then, the controller 30 selects one of the detection points arranged at the first edge E1 which is closest to the center position Q of the sheet placement area 12 on the X-axis and, based on this selected detection point, determines the reference read position in the sub-scanning directions. Likewise, the controller 30 detects a plurality of detection points arranged at predetermined intervals at the second edge E2. Then, the controller 30 selects one of the detection points arranged at the second edge E2 which is closest to the center position Q of the sheet placement area 12 on the Y-axis and, based on this selected detection point, determines the reference read position in the main-scanning direction. In this case, it is unnecessary to set a read area widely apart from the frame member 11, as opposed to the case where the read image is defined equally in consideration of production tolerances. Consequently, the printer 1 helps reduce non-uniform luminance of the rear surface of a sheet to be read, thereby successfully providing a quality read image.

In this embodiment, two detection points, or the first detection point P1 and the second detection point P2, are arranged at the first edge E1. However, the number of detection points arranged at the first edge E1 is not limited to any specific one. Alternatively, for example, three or more detection points may be arranged at the first edge E1. Likewise, two detection points, or the third detection point P3 and the fourth detection point P4, are arranged at the second edge E2. However, the number of detection points arranged at the second edge E2 is not limited to any specific one. Alternatively, three or more detection points may be arranged at the second edge E2.

The first detection point P1 and the second detection point P2 are set on the side, or the first side H1 in this embodiment, of the sheet mat 8 which faces the first edge E1. The third detection point P3 and the fourth detection point P4 are set on the side, or the second side H2 in this embodiment, of the sheet mat 8 which faces the second edge E2. As a result, the read area for the read sensor 15 is defined within the area of the sheet mat 8. In other words, the areas between the first edge E1 and the first side H1 and between the second edge E2 and the second side H are defined outside the read area. Therefore, the printer 1 helps reduce non-uniform luminance of the rear surface of a sheet to be read, thereby successfully providing a quality read image.

If one or both of the reference read positions in main-scanning direction and in the sub-scanning directions are set outside a predetermined area, the controller 30 may perform an error process, thereby reducing the risk of providing improper reference read positions. In the foregoing embodiment, the controller 30 performs the error process when one or both of the correction values Omain and Osub become negative.

To accurately detect the first detection point P1, the second detection point P2, the third detection point P3, and the fourth detection point P4, a surface 7b of the sheet cover 7 which faces the sheet placement area 12 preferably has a black portion around the sheet mat 8, and the sheet cover 7 preferably has a white color, as illustrated in FIG. 9. In addition, the elastic member 7a made of sponge, for example, may be disposed between the sheet cover 7 and the sheet mat 8 as illustrated in FIG. 9. This configuration can enhance a luminance contrast between the sheet mat 8 and its surrounding area, thereby enabling the controller 30 to more accurately detect the first detection point P1, the second detection point P2, the third detection point P3, and the fourth detection point P4. To color the surface 7b on the rear surface of the sheet cover 7, a colorant or a colored sheet member may be used.

If the printer 1 reads an image on a sheet with low light transparency, the reference read positions may be set closer to the first edge E1 and the second edge E2 as long as the read area is allowed to be set outside the sheet mat 8. In this case, the controller 30 may calculate correction values Omain_L and Osub_L (see FIG. 8) by using following equations (3) and (4):

$$O\text{main}\_L = sd + b - G2 \quad (3), \text{ and}$$

$$O\text{sub}\_L = G1 - md - a \quad (4),$$

where sd denotes a shorter one of the distances s1 and s2, and md denotes a longer one of the distances m1 and m2.

Before the printer 1 starts the scanning operation, the controller 30 may set the reference read position relative to the position of the origin detection mark 41 in the main-scanning direction to (G2+Omain_L) and may also set the reference read position relative to the position of the origin detection mark 41 in the sub-scanning directions to (G1−Osub_L).

Next, with reference to FIG. 10, a description will be given regarding the case where all of the first detection point P1, the second detection point P2, the third detection point P3, and the fourth detection point P4 are set outside the sheet placement area 12. Both the first detection point P1 and the second detection point P2 are set below the first frame 11a (see FIG. 2), and both the third detection point P3 and the fourth detection point P4 are set below the second frame 11b (see FIG. 2). In this embodiment, each of the first to fourth detection points P1 to P4 has a rectangle shape and a black color, and its surrounding area has a white color. Each of the first detection point P1 and the second detection point P2 forms a portion of the first edge E1, and each of the second detection point P2 and the third detection point P3 forms a portion of the second edge E2.

The controller 30 detects the positions of the edges of the first detection point P1 and the second detection point P2 in the +X direction. Then, controller 30 detects the positions of the edges of the third detection point P3 and the fourth detection point P4 in the −Y direction.

Figure 10:
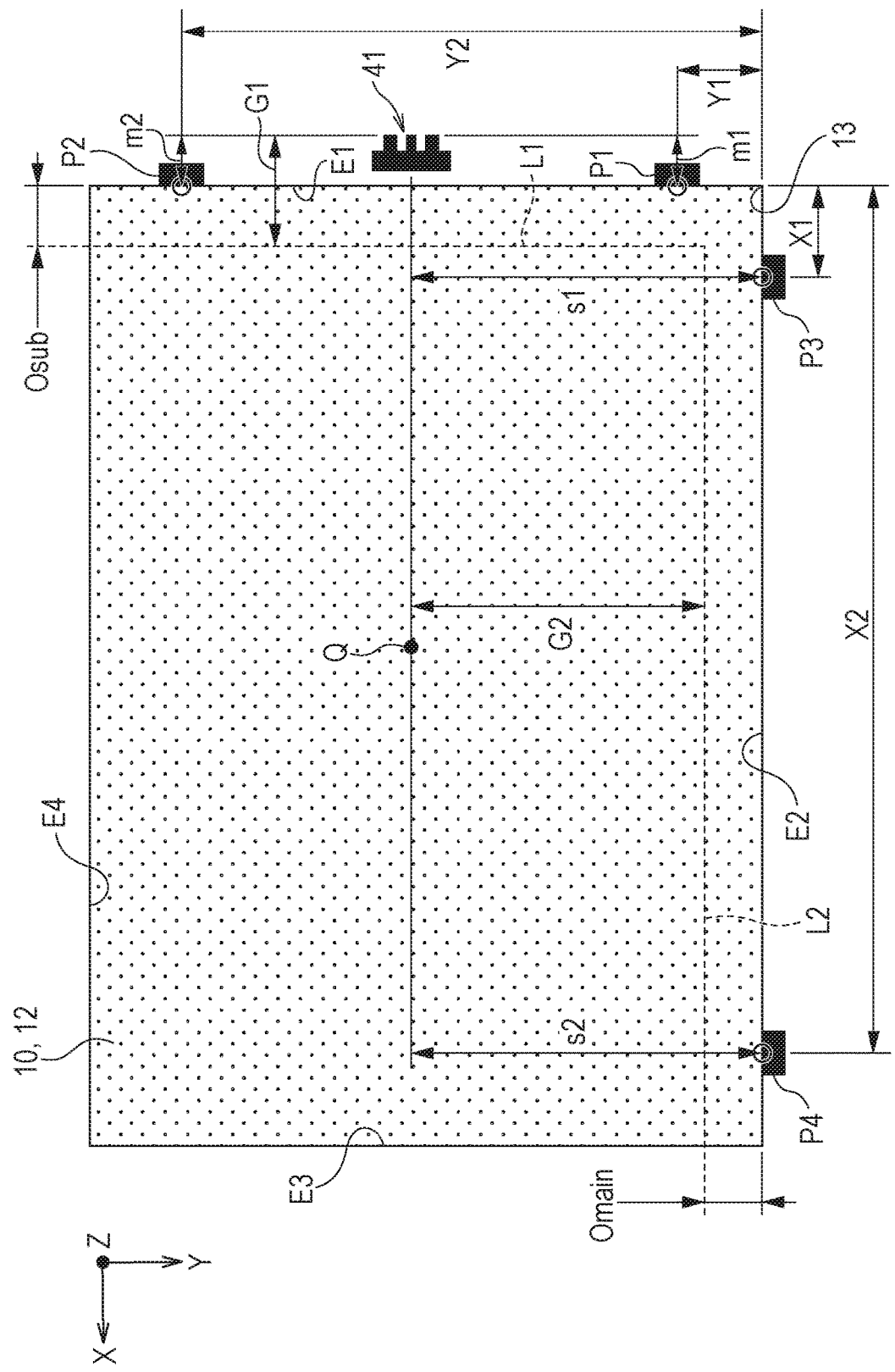
FIG. 10 illustrates another positional relationship of the origin detection mark and the first, second, third, and fourth detection points.

In the example of FIG. 10, the controller 30 calculates correction values Omain and Osub in a manner similar to the way described in the example of FIG. 8, more concretely, by using equations (1) and (2) described below again:

$$O\text{main} = sd - G2 \quad (1), \text{ and}$$

$$O\text{sub} = G1 - md \quad (2),$$

where sd denotes a shorter one of the distances s1 and s2, and md denotes a longer one of the distances m1 and m2.

Before the printer 1 starts the scanning operation, the controller 30 sets the reference read position relative to the position of the origin detection mark 41 in the main-scanning direction to (G2+Omain) and also sets the reference read position relative to the position of the origin detection mark 41 in the sub-scanning directions to (G1−Osub). In this way, it is possible to set the reference read positions closer to the first edge E1 and the second edge E2.

Next, with reference to FIG. 11, a description will be given below regarding the case where all of the first detection point P1, the second detection point P2, the third detection point P3, and the fourth detection point P4 are set within the area of a sheet member J. More specifically, both the first detection point P1 and the second detection point P2 are set on a first side J1 of the sheet member J, whereas both the third detection point P3 and the fourth detection point P4 are set on a second side J2 of the sheet member J. When the user places the sheet member J in the sheet placement area 12 with its one corner positioned at the reference corner 13, the first side J1 of the sheet member J coincides with the first edge E1, and the second side J2 of the sheet member J coincides with the second edge E2.

In this embodiment, each of the first to fourth detection points P1 to P4 has a rectangle shape and a black color, and its surrounding area has a white color. Each of the first detection point P1 and the second detection point P2 forms a portion of the first side J1, and each of the second detection point P2 and the third detection point P3 forms a portion of the second side J2. The controller 30 detects the positions of the edges of the first detection point P1 and the second detection point P2 in the −X direction. Then, controller 30 detects the positions of the edges of the third detection point P3 and the fourth detection point P4 in the +Y direction.

Figure 11:
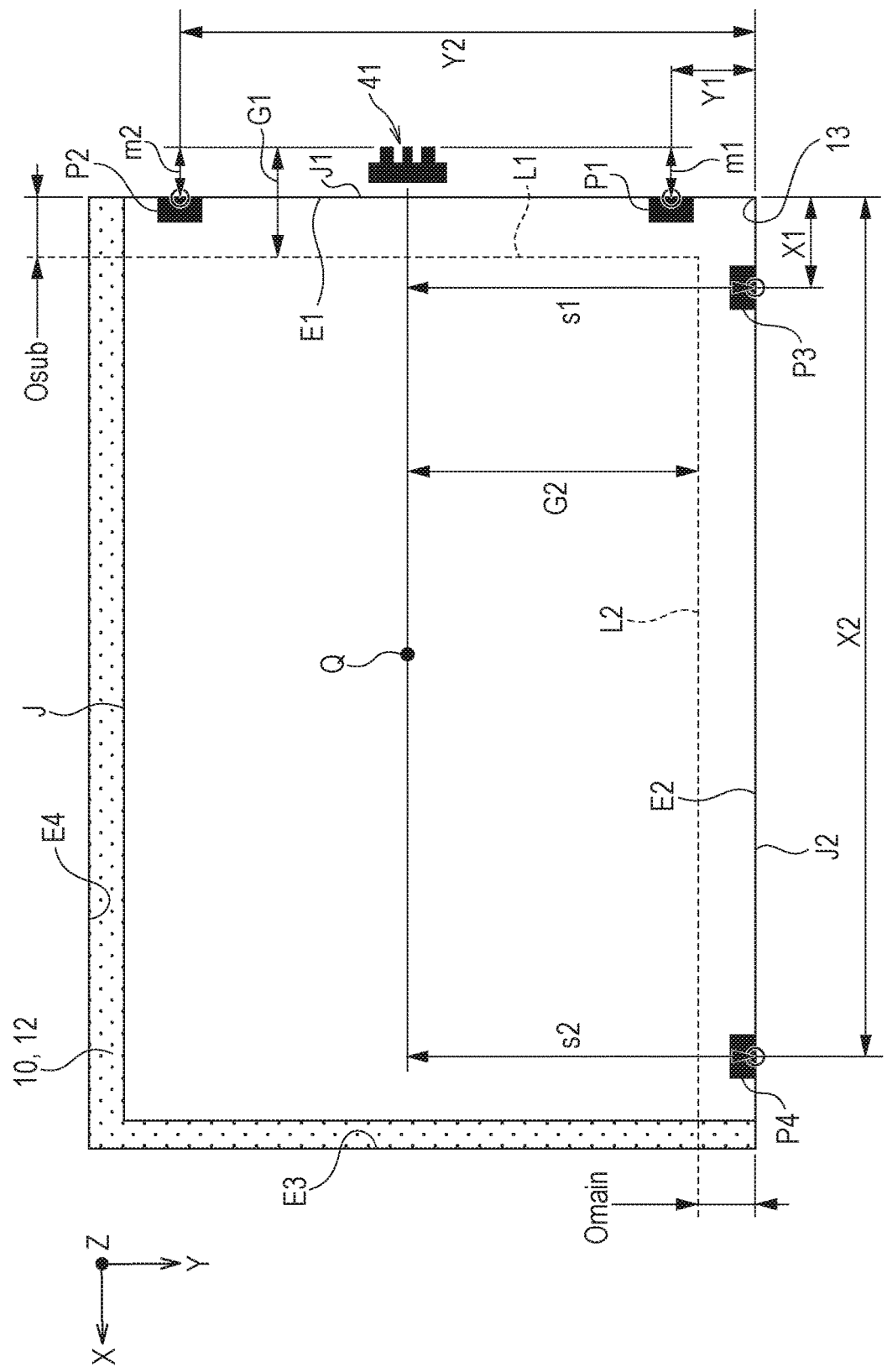
FIG. 11 illustrates still another positional relationship of the origin detection mark and the first, second, third, and fourth detection points.

In the example of FIG. 11, the controller 30 calculates correction values Omain and Osub in a manner similar to the way described in the examples of FIGS. 8 and 10, more concretely, by using equations (1) and (2) described below again:

$$O\text{main} = sd - G2 \quad (1), \text{ and}$$

$$O\text{sub} = G1 - md \quad (2),$$

where sd denotes a shorter one of the distances s1 and s2, and md denotes a longer one of the distances m1 and m2.

Before the printer 1 starts the scanning operation, the controller 30 sets the reference read position relative to the position of the origin detection mark 41 in the main-scanning direction to (G2+Omain) and also sets the reference read position relative to the position of the origin detection mark 41 in the sub-scanning directions to (G1−Osub). In this way, it is possible to set the reference read positions closer to the first edge E1 and the second edge E2.

If one or both of the reference read positions in main-scanning direction and in the sub-scanning directions are set outside a predetermined area in the examples of FIGS. 10 and 11, the controller 30 may also perform an error process, thereby reducing the risk of providing improper reference read positions. In the foregoing embodiment, the controller 30 performs the error process when one or both of the correction values Omain and Osub become negative.

The foregoing embodiment is an example and thus is not intended to limit the present disclosure. It can be understood that the embodiment may undergo various modifications, variations, and replacements within the scope of the claims and, even in this case, the embodiment also falls within the scope of the present disclosure.

What is claimed is:

1. An image reading apparatus comprising:
   a sheet placement section in which a sheet to be read is placed;

a reader disposed to extend in a first axial direction, the reader being configured to read the sheet placed in the sheet placement section during a movement of the reader in a second axial direction, the second axial direction intersecting the first axial direction;

a frame member that includes a first frame and a second frame, the first frame having a first edge, the first edge extending in the first axial direction, the second frame having a second edge, the second edge extending in the second axial direction, both of the first edge and the second edge defining a sheet placement area in the sheet placement section; and a controller that controls the reader, wherein the controller detects a plurality of detection points along the first edge, sets a detection point from the plurality of detection points arranged along the first edge, the selected detection point being closest to a center of the sheet placement area in the second axial direction, and determines a reference read position in the second axial direction, based on the selected detection point, and the controller detects a plurality of detection points along the second edge, sets a detection point from the plurality of detection points arranged along the second edge, the selected detection point being closest to a center of the sheet placement area in the first axial direction, and determines a reference read position in the first axial direction, based on the selected detection point.

2. The image reading apparatus according to claim 1, wherein the plurality of detection points arranged along the first edge include a first detection point and a second detection point, and the plurality of detection points arranged along the second edge include a third detection point and a fourth detection point.

3. The image reading apparatus according to claim 2, further comprising:

a press member that presses the sheet placed in the sheet placement area; and a cover member that covers the sheet placement area, wherein both of the first detection point and the second detection point are set on a first side of the press member, the first side facing the first edge, both of the third detection point and the fourth detection point are set on a second side of the press member, the second side facing the second edge, and a read area for the reader is defined within an area of the press member.

4. The image reading apparatus according to claim 3, wherein the press member has a white color, and a surface of the cover which faces the sheet placement area has a black portion around the press member.

5. The image reading apparatus according to claim 2, wherein both of the first detection point and the second detection point are set on the first frame, and both of the third detection point and the fourth detection point are set on the second frame.

6. The image reading apparatus according to claim 2, wherein all of the first detection point, the second detection point, the third detection point, and the fourth detection point are set on a sheet member disposed in the sheet placement area.

7. The image reading apparatus according to claim 1, wherein when one or both of the reference read positions in the first axial direction and the second axial direction are set outside a predetermined area, the controller performs an error process.

* * * * *